(12) United States Patent
Moertl et al.

(10) Patent No.: US 6,766,405 B2
(45) Date of Patent: Jul. 20, 2004

(54) ACCELERATED ERROR DETECTION IN A BUS BRIDGE CIRCUIT

(75) Inventors: Daniel Frank Moertl, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 10/109,425

(22) Filed: Mar. 28, 2002

(65) Prior Publication Data

US 2003/0188055 A1 Oct. 2, 2003

(51) Int. Cl.[7] .......................... G06F 13/20; G06F 13/36
(52) U.S. Cl. ..................... 710/311; 710/313; 710/107; 710/36
(58) Field of Search ............................ 710/36, 37, 107, 710/100, 306, 311, 313

(56) References Cited

U.S. PATENT DOCUMENTS

| | | | |
|---|---|---|---|
| 5,737,545 A | 4/1998 | Wszolek et al. | 395/288 |
| 5,850,529 A | 12/1998 | Nakamura | 395/288 |
| 5,915,104 A | 6/1999 | Miller | 395/309 |
| 5,961,623 A | 10/1999 | James et al. | 710/113 |
| 6,016,525 A | 1/2000 | Corrigan et al. | 710/100 |
| 6,108,739 A | 8/2000 | James et al. | 710/113 |
| 6,175,889 B1 | 1/2001 | Olarig | 710/129 |
| 6,182,248 B1 | 1/2001 | Armstrong et al. | 714/43 |
| 6,199,137 B1 | 3/2001 | Aguilar et al. | 710/129 |
| 6,202,103 B1 | 3/2001 | Vonbank et al. | 710/15 |
| 6,230,216 B1 * | 5/2001 | Chambers et al. | 710/4 |
| 6,233,641 B1 | 5/2001 | Graham et al. | 710/131 |
| 6,581,129 B1 * | 6/2003 | Buckland et al. | 710/306 |
| 6,643,724 B2 * | 11/2003 | Bauman et al. | 710/260 |
| 6,647,454 B1 * | 11/2003 | Solomon | 710/310 |
| 2003/0046473 A1 * | 3/2003 | Dobson et al. | 710/306 |
| 2003/0120850 A1 * | 6/2003 | Mackey | 710/306 |

FOREIGN PATENT DOCUMENTS

WO 9635175 11/1996 ......... G06F/13/364

OTHER PUBLICATIONS

Technical Disclosure Bulletin RA895–0040, "Manufacturing Test Mode for the Peripheral Component Interconnect Bus", A Cohen, W.G. Holland, R.S. Kolvick and J.F. Logan, vol. 38, No. 08, Aug. 1995, pp. 57–60.

* cited by examiner

Primary Examiner—Kim Huynh
(74) Attorney, Agent, or Firm—Dugan & Dugan, LLP

(57) ABSTRACT

A split operation such as a split read or a split write is handled by a bus bridge circuit. The bus bridge receives the read or write command from a requesting device, where the command includes a bus number for routing a completion of the command. The bus bridge then compares the bus number received from the requesting device with the return route bus number range of the bus bridge, and issues a split response to the requesting device if the bus number matches the return route bus number range of the bus bridge. If the bus number does not match the return route bus number range, then the command is aborted.

14 Claims, 5 Drawing Sheets

ACCELERATED ERROR DETECTION IN A BUS BRIDGE CIRCUIT

FIELD OF THE INVENTION

The present invention is concerned with computer systems, and is more particularly concerned with error detection by bus bridge circuits in computer systems.

BACKGROUND OF THE INVENTION

FIG. 1 is a block diagram of a typical computer system which employs bus bridge circuits ("bus bridges" or "bridges") to provide interconnections between buses. Reference numeral 10 generally indicates the computer system. The computer system 10 includes a processor 12 connected via a system bus 14 to a system memory 16. A host bridge 18 connects the system bus 14 to a first PCI (Peripheral Component Interconnect) bus 20. A first PCI/PCI bridge 22 connects the first PCI bus 20 to a second PCI bus 24. A second PCI/PCI bridge 26 connects the second PCI bus 24 to a third PCI bus 28. I/O (input/output) adapters 30 are connected to the third PCI bus 28.

A third PCI/PCI bridge 32 connects the second PCI bus 24 to a fourth PCI bus 34. I/O adapters 36 are connected to the fourth PCI bus 34. A fourth PCI/PCI bridge 38 connects the first PCI bus 20 to a fifth PCI bus 40. I/O adapters 42 are connected to the fifth PCI bus 40.

FIG. 2 shows additional details of the portion of FIG. 1 that is concerned with the fourth PCI/PCI bridge 38 and the fifth PCI bus 40. In particular, FIG. 2 shows that the fourth PCI/PCI bridge 38 stores base address data 44, limit address data 46, secondary bus number data 48, and subordinate bus number data 50. As will be appreciated by those who are skilled in the art, corresponding data is also stored in the first PCI/PCI bridge 22, the second PCI/PCI bridge 26 and the third PCI/PCI bridge 32. In accordance with conventional practice in connection with the well-known PCI protocol, the base address data 44 and the limit address data 46 define a range of addresses to which request commands may be directed. Also in accordance with conventional practice, the secondary bus number data 48 and the subordinate bus number data 50 together define a range of bus numbers to which completions may be directed.

The well-known PCI bus protocol is an industry standard administered by the PCI Special Interest Group. Also available from PCI Special Interest Group for a fee is information regarding a recent extension of the PCI protocol, referred to as "PCI-X" and described in "PCI-X Addendum PCI Local Bus Specification Revision 1.0a Jul. 24, 2000".

One new feature provided in PCI-X is known as the "split operation". To briefly illustrate a split operation in the context of a read command, a requesting device ("requester") issues a read command, and the target device ("completer") responds with a split response. The completer later issues a split completion to provide the data originally requested by the requester. The split operation feature was added to save bandwidth on the PCI bus by avoiding retries.

FIG. 3 is a flow chart that illustrates performance in accordance with conventional practices of a split read operation in a case where a bridge is positioned between the requesting device and the ultimate target.

The process of FIG. 3 starts at 52, and proceeds to block 54. At block 54 the bridge receives a read command from the requester. The received command includes a PCI address that identifies the target, and an "attribute" which indicates the return address (bus number) for the requester. Following block 54 is block 56. At block 56 the bridge tests the PCI address received at block 54 against the address range defined by the base address data and the limit address data stored in the bridge to determine whether the read command is properly routable by the bridge. Assuming that the received PCI address is proper, block 58 then follows. At block 58 the bridge accepts the read command. Then, at block 60, the bridge issues a split response to the requester.

Following block 60 is block 62. At block 62 the bridge issues a read command on its other bus, passing along the PCI address and the attribute which were received at block 54. The bridge then receives a split response from the completer (block 54). After a certain period of time the bridge then receives a split completion from the completer. The split completion includes an address, i.e. a bus number, used to route the completion back to the requester. Following block 66 is decision block 68. At decision block 68 the bridge determines whether the bus number included in the split completion matches the range of bus numbers supported by the bridge (i.e., the range of bus numbers defined by the secondary bus number data and the subordinate bus number data). If the bus number does match the supported range, then the bridge completes the read operation by transmitting the split completion to the requester (block 70) and the process ends (72).

If a negative determination is made at decision block 68, i.e. if the bus number received in the split completion does not match the range of bus numbers supported by the bridge, then block 74 follows decision block 68. At block 74 the bridge ignores (master aborts) the split completion and the process ends (72).

The path through block 74, leading to aborting of the split completion, may occur if the attribute originally provided by the requester was incorrect. This, in turn, may result from corruption of data in the requester, or reassignment of bus numbers by the host without the requester having been properly updated.

The present inventors have recognized certain problems that arise in connection with the conventional split-operation handling process of FIG. 3, and particularly with the aborting of the split completion at block 74. Specifically, the aborting of the split completion leads the completer to issue a general error message which does not (cannot) identify the requester, which is likely the source of the bad bus number. As a result, the system may be unable to identify the source of the malfunction, and may be prevented from making a recovery from the error condition. Furthermore, upon the issuance of the split response at block 60, the requester may lock resources, such as a buffer in which the desired data is to be written. Also, the bridge may lock a resource, such as a register for storing state information, upon receipt of the split response at block 64. Both the locked resources at the requester and the locked resources at the bridge may remain locked indefinitely upon aborting of the split completion.

SUMMARY OF THE INVENTION

According to a first aspect of the invention, a method of handling a split operation at a bus bridge is provided. The inventive method includes receiving at the bus bridge a read or write command from a requesting device, where the command includes a bus number for routing a completion of the command. The inventive method further includes comparing the bus number received from the requesting device with the return route bus number range of the bus bridge, issuing a split response to the requesting device if the bus number matches the return route bus number range of the bus bridge, and aborting the command if the bus number does not match the return route bus number range of the bus bridge.

In at least one embodiment, the read or write command may be received at the bus bridge via a PCI-X bus. The requesting device may be an I/O adapter.

According to a second aspect of the invention, a computer system is provided. The inventive computer system includes a requesting device connected to a first bus, a completing device connected to a second bus, and a bus bridge interconnecting the first bus and the second bus. The bus bridge is operative to receive a read or write command from the requesting device, where the command includes a bus number for routing a completion of the command. The bus bridge is further operative to (a) compare the bus number with the return route bus number range of the bus bridge, (b) issue a split response to the requesting device if the bus number matches the return route bus number range of the bus bridge, and (c) abort the command if the bus number does not match the return route bus number range. The completing device may be a host bridge.

Numerous other aspects are provided as are computer program products. Each inventive computer program product may be carried by a medium readable by a computer (e.g., a carrier wave signal, a floppy disk, a hard drive, a random access memory, etc.).

With the present invention, an error in an attribute (return address bus number) included by a requesting device in a read or write command can be identified early in the split operation process, so that a requesting device which causes a malfunction can be identified, thereby enhancing the likelihood that the system can recover from the malfunction. Furthermore, the error is detected early enough to prevent open-ended locking of resources of the requesting device and the bridge.

Other objects, features and advantages of the present invention will become more fully apparent from the following detailed description of exemplary embodiments, the appended claims and the accompanying drawings.

DETAILED DESCRIPTION OF THE DRAWINGS

There will now be described, with reference to FIGS. 4A–B, a process provided in accordance with the invention whereby a split operation is handled in a bus bridge circuit. The inventive process may be performed, for example, in any one or more of the bridge circuits 22, 26, 32 and 38 of the computer system 10 shown in FIG. 1. It is also contemplated to apply the present invention in any computer system in which split operations are performed, and which includes a bridge circuit that interconnects two buses.

Figure 3:
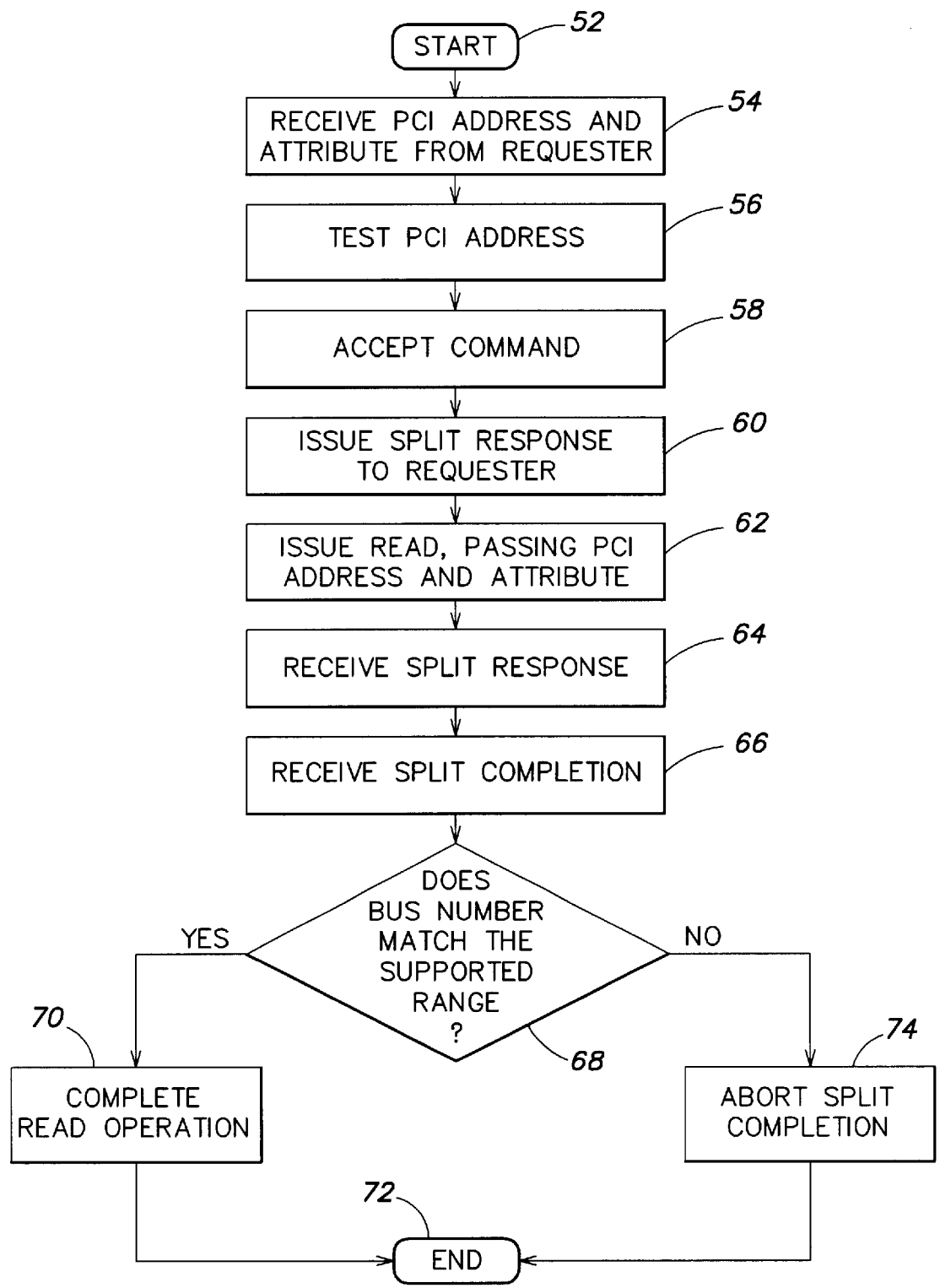
FIG. 3 is a flow chart that illustrates a process for handling a split operation, in accordance with conventional practices, at a bridge circuit that is part of the computer system of FIG. 1.
Figure 4A:
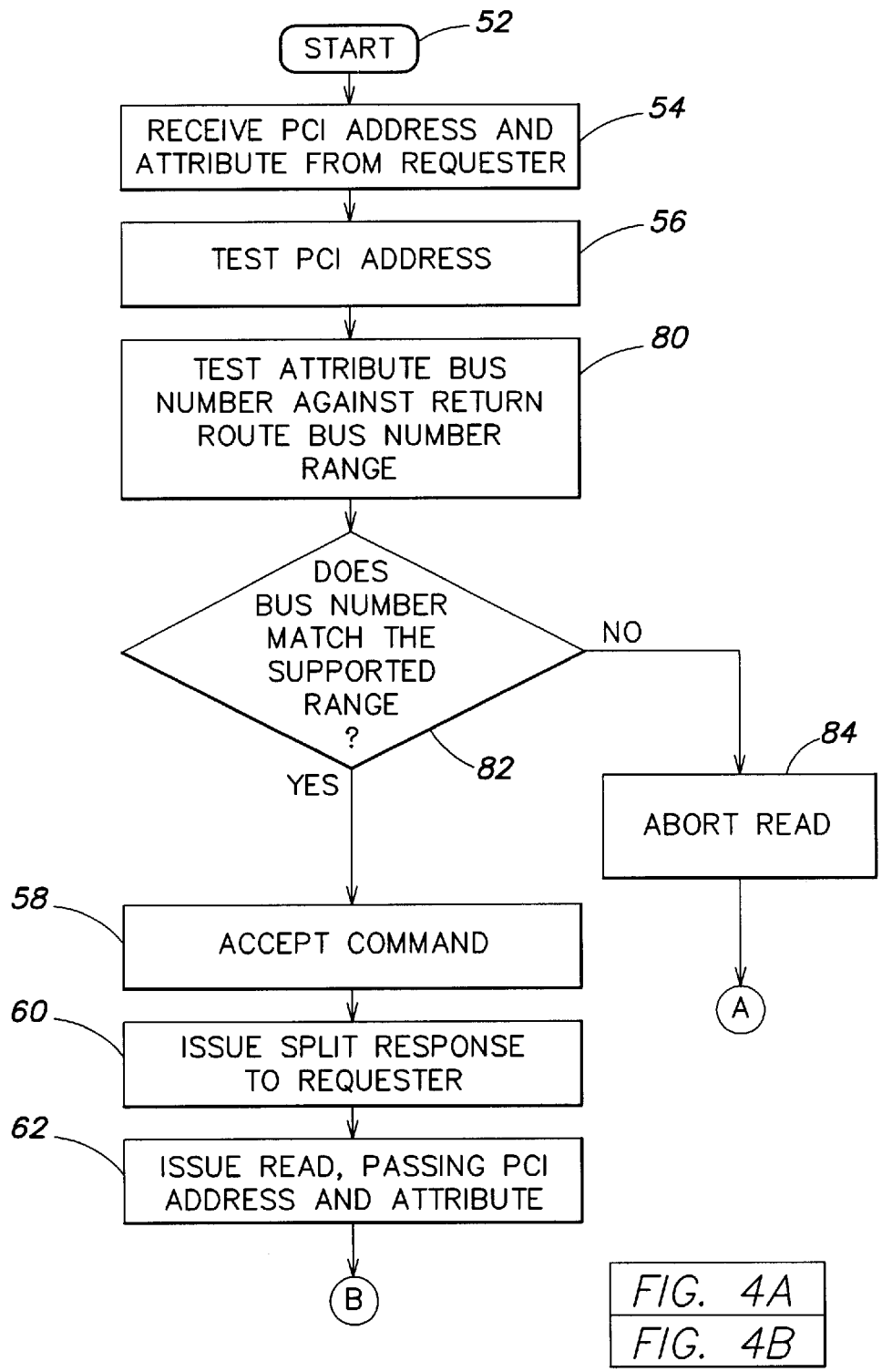
FIGS. 4A–B together form a flow chart that illustrates a procedure for handling a split operation in a bridge circuit in accordance with the invention.
Figure 4B:
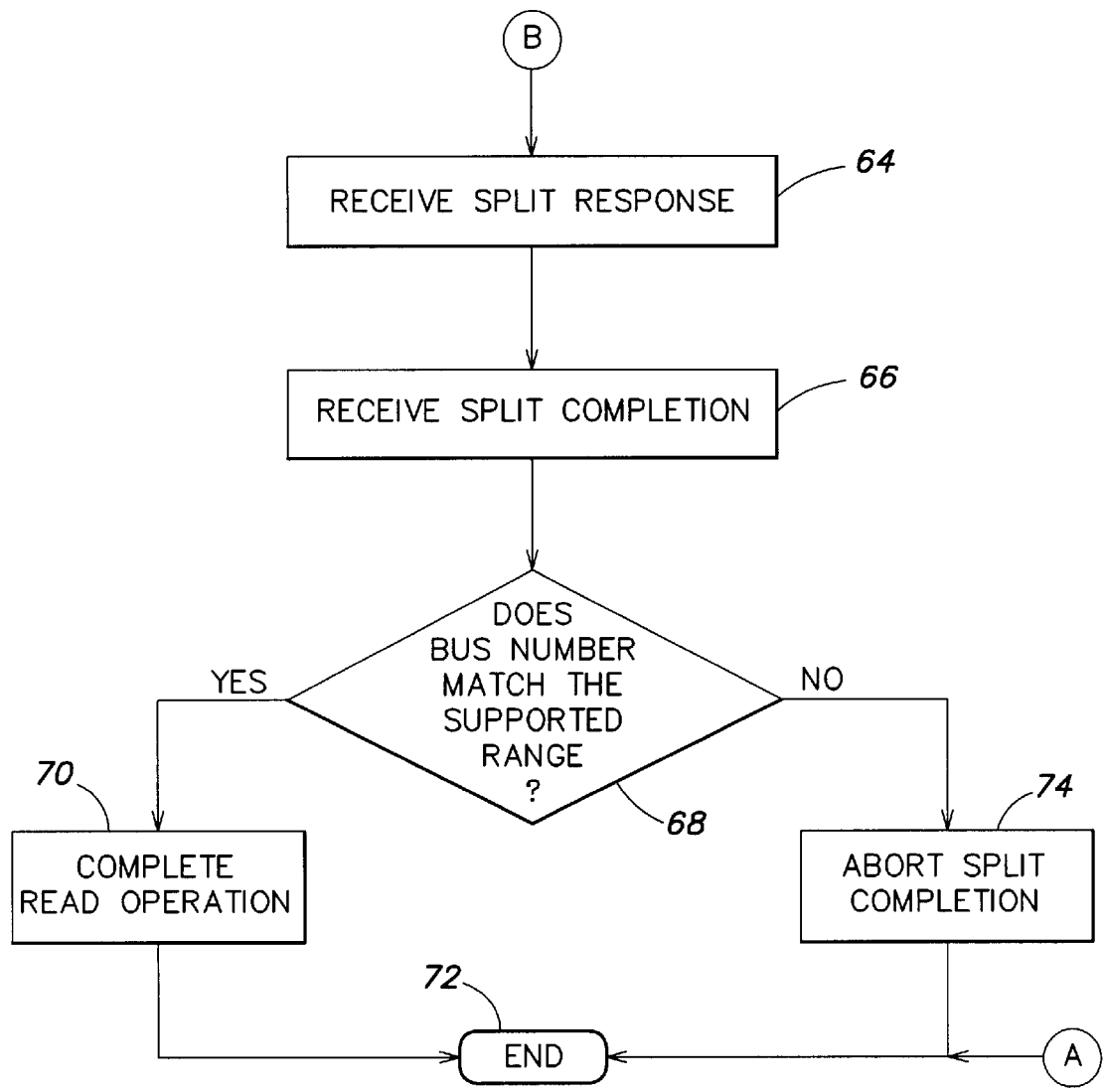

FIGS. 4A and 4B together form a flow chart that illustrates how the inventive split operation handling method differs from the conventional process of FIG. 3. In FIGS. 4A and 4B, process steps that are the same as in FIG. 3 are assigned the same reference numerals as in FIG. 3.

As in the process of FIG. 3, the inventive process of FIGS. 4A and 4B starts at 52 and proceeds to block 54, at which the bridge receives from the requesting device a read command which includes a PCI address and an attribute. The PCI address is tested at block 56. Assuming that the PCI address is proper, block 80 is provided in accordance with the invention after block 56. At block 80, the bridge compares the attribute (bus number) received at block 54 to the return route bus number range for the bridge. Following block 80 is a decision block 82, at which it is determined whether the bus number received from the requesting device matches the range of bus numbers supported by the bridge. If a negative determination is made at decision block 82, then the bridge aborts the read operation (block 84). In aborting the read operation, the bridge may transmit an error indication to the requesting device. The requesting device may then issue an error message, from which the system may be in a position to diagnose the error and perform a system recovery operation. Alternatively, the system may choose to disable the requesting device, leaving the rest of the system able to operate normally. Following the aborting of the read operation at block 84, the inventive process ends (72; FIG. 4B).

If a positive determination is made at decision block 82, then block 58 follows decision block 82. As described before in connection with FIG. 3, at block 58 the bridge accepts the command received at block 54 and then issues a split response to the requester (block 60). The bridge then issues a read command on the other bus (block 62), passing the PCI address and the attribute received at block 54. Then a split response is received by the bridge (block 64; FIG. 4B). At some point following block 64, the bridge receives a split completion from a completing device (block 66). Then, as before, decision block 68 follows block 66. At decision block 68, the bridge determines whether the bus number received in the split completion at block 66 matches the bus number range supported by the bridge. If so, the bridge completes the read operation (block 70) and the process ends (72). If a negative determination is made at block 68, which may indicate an error condition generated at the completing device, the split completion is aborted (block 74) and the process ends (72).

Although the present invention has been illustrated in FIGS. 4A and 4B in connection with a split read operation, it should be understood that the present invention may also be applied in connection with split write operations.

Figure 1:
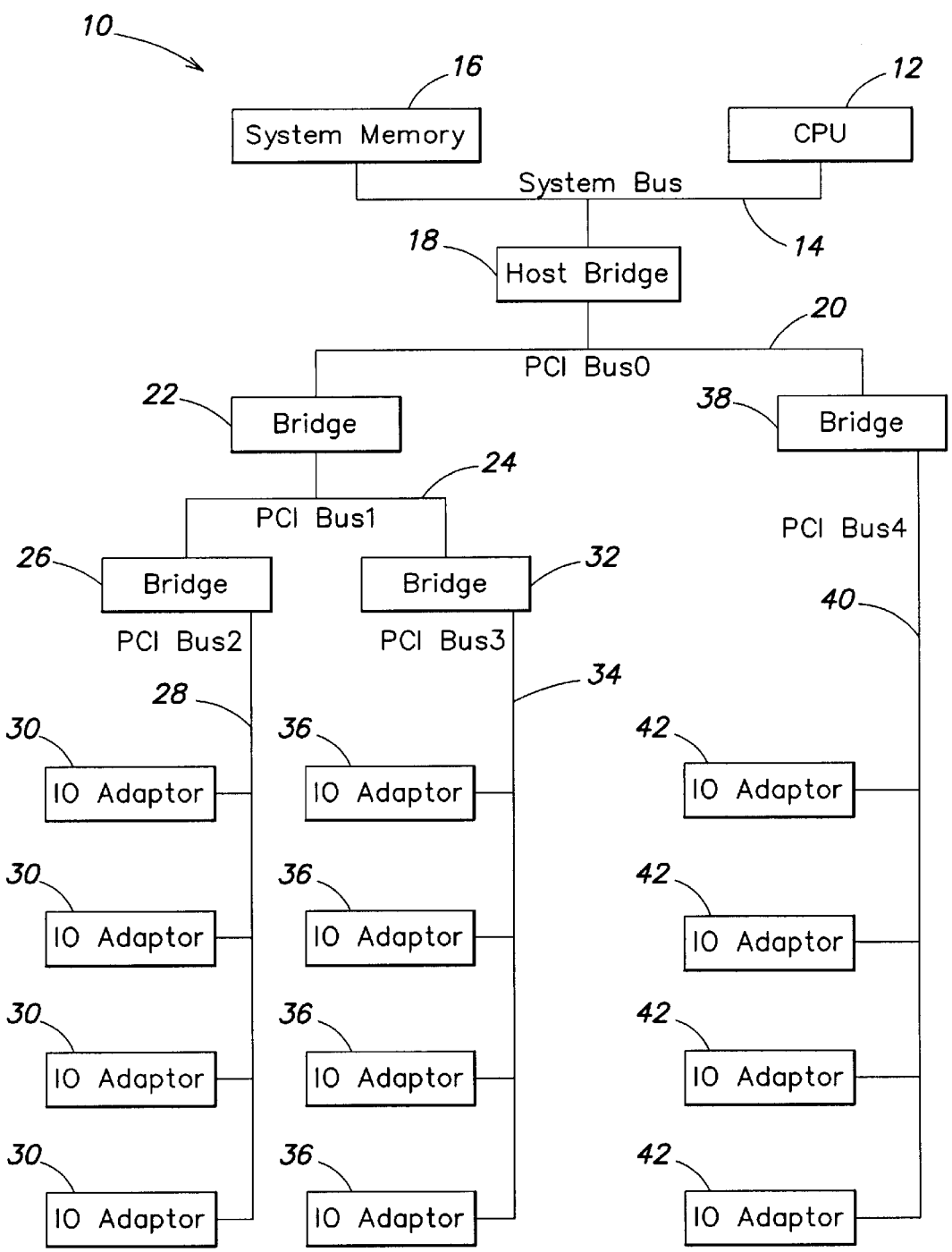
FIG. 1 is a block diagram that illustrates a conventional computer system in which the present invention may be applied.
Figure 2:
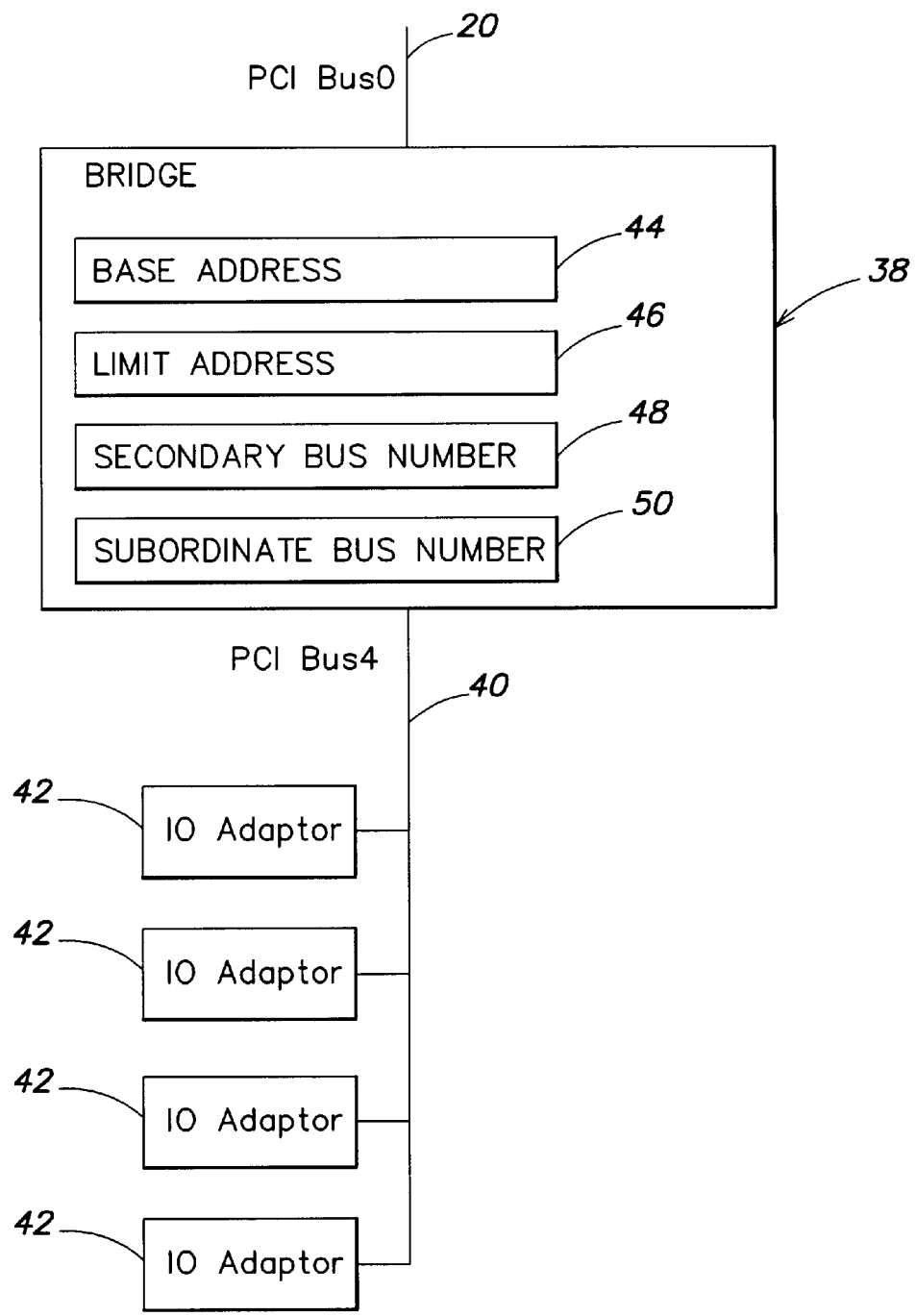
FIG. 2 is another block diagram which shows certain details of portions of the computer system of FIG. 1.

To provide a concrete example in reference to the computer system illustrated in FIG. 1, the requesting device may be one of the I/O adapters 42, in which case the host bridge 18 would be the completing device, and the present invention would be carried out in the fourth PCI/PCI bridge 38. It will be understood that other combinations of requesting and completing devices are possible.

In one embodiment of the invention, the bridge, such as one or more of the bridges 22, 26, 32, and 38, includes logic circuitry which performs the inventive process illustrated in FIGS. 4A and 4B. Design of such logic circuitry is well within the capability of those who are skilled in the art. Alternatively, the inventive process of FIGS. 4A and 4B may be performed by processing circuitry that is programmed in accordance with suitable software. The writing of such software is also well within the capability of those who are skilled in the art.

In the inventive process disclosed herein, the bridge operates to detect an error in the attribute data at an early stage in the split operation, i.e. before the bridge provides a split response. The requesting device which provided the bad attribute data can accordingly be identified and an appropriate error recovery process initiated. Furthermore, since no split response is either provided by or sent to the bridge, there are no resources that are locked in either the requesting device or in the bridge.

The foregoing description discloses only exemplary embodiments of the invention; modifications of the above disclosed apparatus and methods which fall within the scope of the invention will be readily apparent to those of ordinary skill in the art. For example, although the present invention has been described in connection with operation of PCI-X buses, it is also contemplated that the present invention could be applied in other types of buses on which split operations may be performed.

Moreover, the architecture of computer systems in which the present invention may be applied may be different from the system architecture illustrated in FIG. 1.

Accordingly, while the present invention has been disclosed in connection with exemplary embodiments thereof, it should be understood that other embodiments may fall within the spirit and scope of the invention, as defined by the following claims.

The invention claimed is:

1. A method of handling a split operation at a bus bridge, comprising:
   receiving at the bus bridge a read or write command from a requesting device, the command including a bus number for routing a completion of the command;
   comparing the bus number received from the requesting device with a return route bus number range of the bus bridge;
   issuing a split response to the requesting device if the bus number matches the return route bus number range of the bus bridge; and
   aborting the command if the bus number does not match the return route bus number range of the bus bridge.

2. The method of claim 1, wherein the read or write command is received at the bus bridge via a PCI-X bus.

3. The method of claim 1, wherein the requesting device is an I/O adapter.

4. The method of claim 1, further comprising:
   issuing a read or write command to a completing device if the bus number matches the return route bus number range of the bus bridge.

5. The method of claim 4, wherein the completing device is a host bridge.

6. A computer system, comprising:
   a requesting device connected to a first bus;
   a completing device connected to a second bus; and
   a bus bridge interconnecting the first bus and the second bus, the bus bridge operative to:
      receive a read or write command from the requesting device, the command including a bus number for routing a completion of the command;
      compare the bus number with a return route bus number range of the bus bridge;
      issue a split response to the requesting device if the bus number matches the return route bus number range of the bus bridge; and
      abort the command if the bus number does not match the return route bus number range of the bus bridge.

7. The computer system of claim 6, wherein the first and second buses are PCI-X buses.

8. The computer system of claim 6, wherein the requesting device is an I/O adapter.

9. The computer system of claim 8, wherein the completing device is a host bridge.

10. The computer system of claim 6, wherein the bus bridge is further operative to issue a read or write command to the completing device if the bus number matches the return route bus number range of bus bridge.

11. A bus bridge arranged to:
   receive a read or write command from a requesting device, the command including a bus number for routing a completion of the command;
   compare the bus number with a return route bus number range of the bus bridge;
   issue a split response to the requesting device if the bus number matches the return route bus number range; and
   abort the command if the bus number does not match the return route bus number range.

12. The bus bridge of claim 11, wherein the bus bridge connects a first PCI bus to a second PCI bus.

13. The bus bridge of claim 11, wherein the bus bridge is arranged to issue a read or write command to a completing device if the bus number matches the return route bus number range of the bus bridge.

14. A computer program product for handling a split operation at a bus bridge, the computer program product comprising:
   a medium readable by a computer, the computer readable medium having computer program code adapted to:
      receive a read or write command from a requesting device, the command including a bus number for routing a completion of the command;
      compare the bus number received from the requesting device with a return route bus number range of the bus bridge;
      issue a split response to the requesting device if the bus number matches the return route bus number range of the bus bridge; and
      abort the command if the bus number does not match the return route bus number range of the bus bridge.

* * * * *